Patented June 17, 1930

1,765,254

UNITED STATES PATENT OFFICE

JOSEPH A. WYLER, OF ALLENTOWN, PENNSYLVANIA, ASSIGNOR TO TROJAN POWDER COMPANY, OF NEW YORK, N. Y., A CORPORATION OF NEW YORK

PROCESS FOR CONCENTRATING NITROUS GASES

No Drawing.    Application filed December 8, 1927.  Serial No. 238,729.

The principal object of this invention is to provide a novel and useful method for recovering oxides of nitrogen from gases in which these oxides are present in diluted condition, the procedure being primarily useful as an adjunct to various processes now in use for converting nitrogen oxides to nitric acid, nitrates or nitrites.

In such conversion processes, there are usually formed waste gases containing a small percentage of the oxides of nitrogen, and these oxides are allowed to go to waste due to the high cost of their recovery in such dilute condition or due to the fact that their recovery produces salts which at the time are not commercially valuable. The present invention contemplates a highly practical and relatively inexpensive method for recovering these oxides, which will be hereinafter referred to as "nitrous gases."

I have discovered that certain alkaline salts possess the property of readily absorbing nitrous gases, and also of later permitting these gases to be evolved in concentrated form under certain easily obtainable conditions. As examples of these salts, I may name sodium chromate, sodium molybdate, sodium tungstate, and sodium arsenate, and in general, the alkali metal salts of the -ic acids of the metals of Group V, odd series, long periods, and of Group VI, even series, long periods, of the Mendelejeff Periodic Classification are suitable for the purpose. These substances are highly soluble in water, are easily reversible from one state of oxidation or basicity to another, and have a relatively high stability towards heat. According to the most recent authorities, Group V mentioned above includes the elements arsenic, antimony and bismuth; and the said Group VI the elements chromium, molybdenum, tungsten and uranium.

In the practice of my invention, I absorb the nitrous gases in a water solution of any of the above salts. This may be done by passing the waste gases containing a small percentage of the oxides of nitrogen, the recovery of which is desired, through a water solution of the absorbing agent. A typical equation of the absorption reactions involving the use of an alkali chromate is as follows:

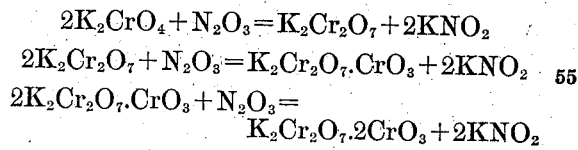

The foregoing equations are given not so much as representative of the actual reactions which take place as to exemplify the manner in which the chromates have available a certain amount of alkali metal oxide for fixing the nitrogen oxide.

Thereafter the absorbing agent is concentrated by evaporation of its solvent, and finally the heating of the salts formed in the absorption process results in the evolution of the nitrous gases in concentrated form and the subsequent regeneration of the original salt or absorbing agent for use in further absorbing operations. The following equation is illustrative of the regenerative reaction:

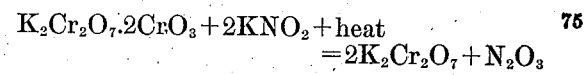

In some instances, such for example as when potassium chromate is employed as the absorbing agent, the absorption operation may be continued to the point where a large amount of precipitate is formed. This precipitate may then be separated, dried and ignited to drive off the nitrous gases, the ignited residue being used to replenish the liquor, from which the precipitate was originally separated, for further absorbing operations. This procedure has the advantage of avoiding considerable evaporation.

As an example of my process, I might dissolve 25 grams of potassium chromate in 100 grams of water and bubble the lower oxides of nitrogen mixed with a large amount of inert gas through this solution, when it will be observed that the color of the solution changes from yellow to red followed by brown, and if the introduction of the lower oxides of nitrogen is continued, a greenish brown precipitate will be formed. At any point the absorbent may be stopped, but since the evaporation of the water in the absorbing solution is the most expensive part of the operation, it is advisable to carry out the absorption until as much as possible has been absorbed without suffering too great a reduction in the rate of absorption, because the amount of water to be evaporated is independent of the amount of nitrogen oxides absorbed per unit of chromate and depends upon the amount of water necessary to hold the chromate in solution. After the absorption has been carried out to the desired degree, the solution is evaporated to dryness, whereupon there is obtained a solid mass comprising a complex mixture of chromates, chromous and chromic oxides, nitrites and nitrates. This residue is then heated, whereupon oxides of nitrogen are driven off in a very concentrated form. The heating is continued until there is no further evolution of the nitrogen oxides, at which time the mass has returned to the composition of the original absorbing substance, potassium chromate. During the evolution of the nitrogen oxides the heat of the mass is gradually raised until at the end of the gas evolution the vessel containing the mass has been raised to a low red heat. Experiments have shown that the 25 grams of potassium chromate in this particular example can be used to absorb nitrogen oxides equivalent to at least 6 grams of $HNO_3$.

In another instance I may carry out the absorption of the nitrogen oxides present in low concentration in a mixture of gases until a rather large precipitate has formed. This precipitate probably consists of potassium chromates, nitrites, nitrates, chromium nitrate, chromic and chromous oxides. This precipitate can be separated from the rest of the solution by filtration, after which it is dried and heated to a low red heat, whereupon the nitrogen oxides are liberated in the form of gas and the residue returns to the form of yellow potassium chromate which is available for re-solution and use as an absorbent for additional quantities of nitrogen oxides, by joining it with the solution which was filtered from the precipitate formed at the end of the absorbing step. This modification has the advantage that it greatly reduces the cost of the operation through the elimination of the step in which the water used to dissolve the potassium chromate is evaporated.

I claim:

1. The process of concentrating nitrous gases, which consists in absorbing the gases in a solution of an alkali metal salt of an -ic acid of the metals of Group V, odd series, long periods and of Group VI, even series, long periods, of the Mendelejeff Periodic Classification, and ultimately heating the reaction products to drive off the nitrous gases in concentrated form and to regenerate the original salt for further absorption operations.

2. The process of concentrating nitrous gases, which consists in absorbing the gases in a solution of an alkali metal salt whose reaction with the nitrous gases is typified by the reaction between nitrous gases and potassium chromate, and ultimately heating the reaction products to drive off the nitrous gases in concentrated form and to regenerate the original alkali metal salt for use in further absorption operations.

3. The process of concentrating nitrous gases, which consists in absorbing the gases in a solution of an alkali metal salt of an -ic acid of the metals of Group V, odd series, long periods and of Group VI, even series, long periods, of the Mendelejeff Periodic Classification, evaporating to dryness, and heating the residue to drive off the nitrous gases in concentrated form and to regenerate the original salt for use in further absorption operations.

4. The process of concentrating nitrous gases, which consists in absorbing the gases in a solution of an alkali metal chromate, and ultimately heating the reaction products to drive off the nitrous gases in concentrated form and to regenerate the original alkali metal chromate.

5. The process of concentrating nitrous gases, which consists in absorbing the gases in a solution of potassium chromate, and ultimately heating the reaction products to drive off the nitrous gases in concentrated form and to regenerate the original potassium chromate.

6. The process of concentrating nitrous gases, which consists in absorbing the gases in a solution of potassium chromate, maintaining said absorption process until a heavy precipitate is formed, and heating the precipitate to drive off the nitrous gases in concentrated form and to regenerate the potassium chromate.

7. The process of concentrating nitrous gases, which consists in absorbing the gases in a solution of potassium chromate, continuing the absorption process until a heavy precipitate is formed, separating the precipitate by filtration, heating the precipitate to drive off the nitrous gases in concentrated form and to regenerate the potassium chromate, and utilizing the regenerated potassium chromate to replenish the filtrate for further absorption operations.

JOSEPH A. WYLER.